US008729205B2

(12) United States Patent
Nabeshima et al.

(10) Patent No.: US 8,729,205 B2
(45) Date of Patent: *May 20, 2014

(54) FLOWABILITY IMPROVER FOR ENGINEERING PLASTICS, THERMOPLASTIC RESIN COMPOSITIONS CONTAINING THE SAME AND MOLDED ARTICLES OF THE COMPOSITIONS

(75) Inventors: Yasuhiko Nabeshima, Hiroshima (JP); Atsunori Koshirai, Toyama (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 908 days.

This patent is subject to a terminal disclaimer.

(21) Appl. No.: 10/573,831

(22) PCT Filed: Sep. 30, 2004

(86) PCT No.: PCT/JP2004/014393
§ 371 (c)(1),
(2), (4) Date: Jan. 12, 2007

(87) PCT Pub. No.: WO2005/030819
PCT Pub. Date: Apr. 7, 2005

(65) Prior Publication Data
US 2007/0213451 A1 Sep. 13, 2007

(30) Foreign Application Priority Data

Sep. 30, 2003 (JP) ................................. 2003-340819
Feb. 25, 2004 (JP) ................................. 2004-049320

(51) Int. Cl.
*C08F 18/16* (2006.01)
*C08F 20/16* (2006.01)
*C08F 12/08* (2006.01)
*C08F 236/10* (2006.01)

(52) U.S. Cl.
USPC ............. 526/346; 524/326; 525/55; 525/190; 525/418

(58) Field of Classification Search
USPC ...................... 526/326, 346; 525/55, 418, 190
See application file for complete search history.

(56) References Cited

U.S. PATENT DOCUMENTS

| | | | | |
|---|---|---|---|---|
| 3,919,108 | A | | 11/1975 | Wilcox et al. |
| 4,906,696 | A | * | 3/1990 | Fischer et al. ................. 525/148 |
| 5,739,235 | A | | 4/1998 | Wilson et al. |
| 5,767,200 | A | * | 6/1998 | Koike ........................... 525/265 |
| 6,084,104 | A | | 7/2000 | Nakano et al. |
| 2002/0119263 | A1 | | 8/2002 | Abe |
| 2005/0159533 | A1 | | 7/2005 | Nabeshima et al. |

FOREIGN PATENT DOCUMENTS

| | | |
|---|---|---|
| CN | 1226890 A | 8/1999 |
| EP | 0 875 788 A1 | 11/1998 |
| EP | 1 010 725 A2 | 6/2000 |
| JP | 52-784 | 1/1977 |
| JP | 54-37977 | 3/1979 |
| JP | 54-37977 | 11/1979 |
| JP | 58-49942 | 3/1983 |
| JP | 59-42024 | 3/1984 |
| JP | 59078219 A * | 5/1984 |
| JP | 59-42024 | 10/1984 |
| JP | 61-145260 | 7/1986 |
| JP | 62-138514 | 6/1987 |
| JP | 64-1749 | 1/1989 |
| JP | 64-81807 | 3/1989 |
| JP | 1-115914 | 5/1989 |
| JP | 01115914 A * 5/1989 | ............ C08F 220/18 |
| JP | 3-24501 | 4/1991 |
| JP | 6-65362 | 3/1994 |
| JP | 6-306230 | 11/1994 |
| JP | 7-5301 | 1/1995 |
| JP | 7-90073 | 4/1995 |
| JP | 8-6021 | 1/1996 |
| JP | 11-181197 | 7/1999 |
| JP | 11181197 A * 7/1999 | ............ C08L 25/00 |
| JP | 2000-178432 | 6/2000 |
| JP | 2000-239477 | 9/2000 |
| JP | 2000-281935 | 10/2000 |
| JP | 2001-524151 | 11/2001 |
| JP | 2006-201667 | 8/2006 |
| JP | 2006-249292 | 9/2006 |
| JP | 2006-257195 | 9/2006 |
| JP | 2009030004 A * | 2/2009 |
| JP | 2009120706 A * | 6/2009 |
| WO | WO 98/27159 | 6/1998 |
| WO | WO 2006/077813 A1 | 7/2006 |

OTHER PUBLICATIONS

English translation of JP 01115914 A; May 1989.*
English translation of JP 11181197 A; Abstract; Jul. 1999.*
English translation of JP 11181197 A; Description; Jul. 1999.*
English translation of JP 59078219; May 1984; Matsunaga et al.*
English abstract of JP 59078219; May 1984; Matsunaga et al.*
Chinese Office Action issued Jan. 26, 2011, in Patent Application No. 200480034416.X (with English-language translation).
E. J. Moon, et al., "Phase Behavior of Tetramethylpolycarbonate Blends with Styrene-Based Methacrylate Copolymers and Their Interaction Energies", Journal of Polymer Science: Part B: Polymer Physics, vol. 40, Dec. 31, 2002, pp. 1288-1297.
Office Action issued Mar. 11, 2011, in Korean Patent Application No. 10-2006-7007980 with English translation.
International Search Report issued Apr. 8, 2008 in PCT/JP2007/074876 filed Dec. 25, 2007 w/English-language.
European Search Report issued Nov. 20, 2009 in European Patent Application No. 20070860105 filed Dec. 25, 2007.
Office Action mailed Jul. 27, 2010, in co-pending U.S. Appl. No. 12/521,040.

* cited by examiner

Primary Examiner — Karuna P Reddy
(74) Attorney, Agent, or Firm — Oblon, Spivak, McClelland, Maier & Neustadt, L.L.P.

(57) ABSTRACT

A flowability improver for engineering plastics which comprises a polymer (A) comprising of 50 to 99.5% by mass of aromatic vinyl monomer units (a1), 0.5 to 50% by mass of (meth)acrylate monomer units (a2) having an ester group of phenyl or substituted phenyl group, and 0 to 40% by mass of other monomer units (a3) (with the proviso that the total of the units (a1) to (a3) is 100% by mass) and having a weight average molecular weight of 5000 to 150000. The flowability improver can improve engineering plastics in melt-flow characteristics (processability in molding) and chemical resistance without impairing the plastics in heat resistance, exfoliation resistance, and transparency.

9 Claims, No Drawings

FLOWABILITY IMPROVER FOR ENGINEERING PLASTICS, THERMOPLASTIC RESIN COMPOSITIONS CONTAINING THE SAME AND MOLDED ARTICLES OF THE COMPOSITIONS

TECHNICAL FIELD

The present invention relates to a flowability improver for engineering plastic resins developing superior flowability improvement and chemical resistance improvement, and thermoplastic resin compositions excellent in flowability, peel resistance, heat resistance, chemical resistance and transparency using the same, and also a molded article, a member for automobiles and a lamp cover using the same.

BACKGROUND ART

Engineering plastics are widely utilized in various fields such as OA (office automation) machineries, information/communications equipment, electricity/electronic equipment, electric appliances, automobile fields and construction fields based on their excellent mechanical strength, heat resistance, electrical characteristics, dimensional stability and so on. However, when, for example, a polycarbonate resin is used, it has problems that melt flowability is inferior due to its high fabrication temperature and chemical resistance is also inferior because this resin is amorphous.

On the other hand, in recent years, resin modifiers which improve melt flowability and injection moldability without impairing superior characteristics of a polycarbonate resin, and thermoplastic resin compositions using these modifiers are required because those molded articles can support demands for size increases, thin-walling, forming complex shapes, high performance, and reducing environmental problems and so on.

As a method of improving melt flowability without impairing characteristics (heat resistance, transparency and so on) of a polycarbonate resin, a method of lowering molecular mass of the polycarbonate resin itself, which is a matrix resin, is general. In addition, flowability improvement by introducing polymer-alloys with a particular styrene-type resin (for example, Patent documents 1 and 2) and flowability improvement by introducing polymer-alloys with a particular methacrylate-type resin (for example, Patent document 3) are proposed.

Also, as a further flowability improvement, a method of adding a polyester oligomer (for example, Patent document 4), a method of adding an oligomer of polycarbonate (for example, Patent document 5) or, a method of adding a styrene-type copolymer with a low molecular weight (for example, Patent documents 6 to 8) are proposed.

In addition, lamp covers made up of aromatic polycarbonate resins such as polycarbonate resins produced from 2,2-bis(4-hydroxyphenyl)propane (bisphenol A as a popular name) have been conventionally used for lamp covers such as lenses for headlamps of automobiles and so on, because they are excellent in mechanical characteristics such as transparency, heat resistance and impact resistance.

In recent years, while a demand for large headlamps of automobile has risen, a demand for large, light weight, and thin-walled lamp covers has also risen. The material with excellent melt flowability while maintaining superior characteristics of an aromatic polycarbonate resin, that is, the material being excellent in moldability of injection molding and so on, is needed to make a lamp cover large, light weight, and thin-walling without impairing superior characteristics of lamp covers made up of aromatic polycarbonate resins.

As a method of improving moldability of resins, (1) a method for lowering molecular mass of a resin for obtaining high melt flowability is general.

In addition, in Patent documents 9 and 10, as a lamp cover excellent in heat resistance, (2) a lamp cover comprising an aromatic polycarbonate resin having 9,9-bis(4-oxyphenylene)fluorene structural unit or 1,1-bis(4-hydroxyphenyl)-3,3,5-trimethylcyclohexane structural unit is proposed.

Patent document 1: Japanese Examined Patent Application, Second Publication No. Sho 59-42024
Patent document 2: Japanese Unexamined Patent Application, First Publication No. Sho 62-138514
Patent document 3: Japanese Patent Publication No. 2622152
Patent document 4: Japanese Examined Patent Application, Second Publication No. Sho 54-37977
Patent document 5: Japanese Unexamined Patent Application, Second Publication No. Hei 3-24501
Patent document 6: Japanese Examined Patent Application, Second Publication No. Sho 52-784
Patent document 7: Japanese Unexamined Patent Application, Second Publication No. Hei 11-181197
Patent document 8: Japanese Unexamined Patent Application, Second Publication No. 2000-239477
Patent document 1: Japanese Unexamined Patent Application, Second Publication No. Hei 6-65362
Patent document 2: Japanese Unexamined Patent Application, Second Publication No. Hei 7-90073

DISCLOSURE OF INVENTION

Problems to be Solved by the Invention

In the conventional methods, there were the following problems, though melt flowability was improved to a certain degree.

At first, although a method of lowering the molecular mass of a polycarbonate resin improves greatly the flowability, lowering the molecular mass falling more than required impairs superior heat resistance and chemical resistance of polycarbonate. In addition, there is a limitation to improve melt flowability by lowering the molecular mass while holding superior characteristics of a polycarbonate resin because impact resistance deteriorates greatly.

In addition, in a method of making polymer-alloys with a particular styrene-type copolymer or a particular acrylic copolymer, balance between peeling resistance and flowability is insufficient yet. Furthermore, although a method of using a particular styrene-type copolymer exhibits a superior melt flowability, surface-layer peeling of a molded article is liable to occur because compatibility is still insufficient, so that a surface appearance and mechanical properties deteriorate greatly. In addition, a particular acrylic copolymer is excellent in compatibility and transparency, however, the particular acrylic copolymer improves melt flowability to provide a small effect. It is necessary to increase the content of an acrylic copolymer to obtain an improvement effect of melt flowability required in recent years. As a result, there is a limitation to improve the flowability while maintaining superior characteristics of polycarbonate such as heat resistance or impact resistance.

In addition, although a method of adding a polyester oligomer or a polycarbonate oligomer is effective for the improvement of flowability, there is a problem that superior heat resistance and impact resistance of polycarbonate become greatly inferior.

Furthermore, although a method of adding a styrene-type copolymer of low molecular mass makes it possible to improve the melt flowability while maintaining heat resistance to a certain degree by a small amount of addition, compatibility is still insufficient so that surface-layer peeling of a molded article is liable to occur. Accordingly, there remain problems that impact resistance, weld appearance which is important for practical use, and face impact are insufficient.

As described above, in the conventional technology, it was still insufficient in the points of improving melt flowability without impairing superior characteristics of engineering plastics such as polycarbonate.

In addition, there were the following problems to make a lamp cover large, light weight, and thin-walling by the above-mentioned conventional methods.

For example, in the above method (1) in which the molecular mass of an aromatic polycarbonate resin is lowered, although melt viscosity is decreased and melt flowability is greatly improved, mechanical properties such as heat resistance and impact resistance are decreased as the molecular mass is lowered, and chemical resistance such as resistance to gasoline necessary for lamp covers of automobiles and so on is also deteriorated. Therefore, there is a limitation to improve moldability by lowering molecular mass while maintaining superior characteristics of an aromatic polycarbonate resin. The aromatic polycarbonate resin having low molecular mass in the level without impairing these characteristics is presently used, and the molding with the high molding temperature set up near to the limit is performed. However, an excessive rise of the molding temperature causes a problem of poor surface appearance such as silver streaks and increase of molding insufficiency.

In the method (2), although it is very good about heat resistance, there remain problems that melt flowability is bad because melt viscosity is too high causing an insufficient moldability, and further, characteristics such as impact resistance, chemical resistance and so on are extremely deteriorated.

As described above, in the conventional technology, the lamp cover that moldability and chemical resistance were improved without impairing superior characteristics of an aromatic polycarbonate resin has not been obtained so far.

The present invention was investigated to solve the problem and is aimed at providing a flowability improver which can improve the melt flowability (moldability) and chemical resistance without impairing heat resistance, peeling resistance and transparency of engineering plastics, a resin composition using the flowability improver and a product using the resin composition. Also, the present invention is aimed at providing a lamp cover with improved moldability and chemical resistance without impairing superior characteristics of a conventional aromatic polycarbonate resin. In addition, lamp covers in the invention includes lens, covers and so on to be used for illuminating lamps such as headlamp lens and covers of automobiles.

Means for Solving Problem

The first aspect of the present invention is a flowability improver for engineering plastics which comprises a polymer (A) comprising 50 to 99.5% by mass of aromatic vinyl monomer unit (a1), 0.5 to 50% by mass of (meth)acrylate monomer unit (a2) having an ester group of phenyl group or substituted phenyl group, and 0 to 40% by mass of other monomer unit (a3) (the total of the units (a1) to (a3) is 100% by mass), and having a weight average molecular weight of 5000 to 150000.

Also, the second aspect of the present invention is a thermoplastic resin composition provided by mixing the flowability improver for engineering plastics with an engineering plastic (B).

Also, the third aspect of the present invention is a molded article, a member for automobiles, and a lamp cover obtained by injection molding of the thermoplastic resin composition.

Effects of the Invention

The flowability improver for engineering plastics of the present invention has a phase separation behavior at the time of melt molding with engineering plastics such as a polycarbonate resin and has compatibility (affinity) with good level in peel resistance in the temperature range of use of the molded articles. By this reason, the present flowability improver can impart remarkable melt flowability (moldability) and chemical resistance without impairing transparency, heat resistance and peel resistance of engineering plastics by mixing with engineering plastics.

In addition, the lamp cover comprising a polycarbonate resin alloys of the present invention has excellent chemical resistance such as resistance to gasoline and melt flowability (moldability), which are necessary for automobile headlamps and so on, without impairing superior transparency and heat resistance of conventional articles, so that it can be suitably utilized for large and thin-walled headlamp covers of automobiles which are highly desired in recent years.

BEST MODE FOR CARRYING OUT THE INVENTION

The present invention is explained in detail in the following.

[Flowability Improver]

The flowability improver for engineering plastics of the present invention (hereinafter merely referred to as the flowability improver) comprises a polymer (A) comprising 50 to 99.5% by mass of aromatic vinyl monomer unit (a1), 0.5 to 50% by mass of (meth)acrylate monomer unit (a2) having an ester group of phenyl group or substituted phenyl group and 0 to 40% by mass of other monomer unit (a3) (with the proviso that the total of the units (a1) to (a3) is 100% by mass) and having a weight average molecular weight of 5000 to 150000.

The flowability improver has a phase separation behavior at the time of melt molding with engineering plastics represented by a polycarbonate resin, and has compatibility (affinity) with good level in peel resistance in the temperature range of use of the molded articles and can develop remarkable effects of melt flowability (moldability) and chemical resistance without impairing characteristics (heat resistance and peel resistance and so on) of engineering plastics.

The flowability improver imparting the excellent improvement effect in flowability and chemical resistance can be developed by containing the prescribed amount of the aromatic vinyl monomer unit (a1) in the copolymer.

Examples of aromatic vinyl monomers composing the aromatic vinyl monomer unit (a1) include styrene, α-methyl styrene, p-methyl styrene, p-t-butyl styrene, p-methoxy styrene, o-methoxy styrene, 2,4-dimethyl styrene, chlorostyrene, bromostyrene, vinyltoluene, vinylnaphthalene, and vinyl anthracene. These can be used alone or in combination of two or more kinds. Among them, styrene, α-methyl styrene and p-t-butyl styrene are preferable.

The content of the aromatic vinyl monomer unit (a1) in the copolymer is 0.5 to 99.5% by mass. When the content of the aromatic vinyl monomer unit (a1) exceeds 99.5% by mass, compatibility with engineering plastics becomes insufficient so that a molded article of the mixture may cause laminar exfoliation and may impair the surface appearance and the mechanical properties. On the contrary, when the content of the aromatic vinyl monomer unit (a1) is less than 0.5% by mass, compatibility with engineering plastics becomes too good so that sufficient phase separation behavior producing remarkable flowability improvement effect may not be able to be developed at the time of melting and improvement effect of chemical resistance tends to deteriorate.

In view of balance of these, the content of the aromatic vinyl monomer unit (a1) in the copolymer is preferably 98% by mass or less, more preferably 96% by mass or less, further preferably 93% by mass or less and most preferably 90% by mass or less.

In addition, this content is preferably 10% by mass or more, more preferably 20% by mass or more, further preferably 50% by mass or more and most preferably 75% by mass or more.

The copolymer to be used for the flowability improver of the present invention contains (meth)acrylate monomer unit (a2) having an ester group of phenyl group or substituted phenyl group. The flowability improver imparting the excellent compatibility (peeling resistance) improvement effect can be developed because the copolymer contains this monomer unit in a prescribed amount.

Examples of monomers composing the (meth)acrylate monomer unit (a2) having an ester group of phenyl group or substituted phenyl group include phenyl(meth)acrylate, 4-t-butylphenyl(meth)acrylate, bromophenyl(meth)acrylate, dibromophenyl(meth)acrylate, 2,4,6-tribromophenyl(meth) acrylate, monochlorophenyl(meth)acrylate, dichlorophenyl (meth)acrylate, and trichlorophenyl(meth)acrylate. These can be used alone or in combination of two or more kinds. Phenyl(meth)acrylate is particularly preferable among them.

It is necessary that the content of the (meth)acrylate monomer unit (a2) having an ester group of phenyl group or substituted phenyl group in the copolymer is 0.5 to 99.5% by mass.

When the content of the (meth)acrylate monomer unit (a2) having an ester group of phenyl group or substituted phenyl group is less than 0.5% by mass, compatibility with engineering plastics becomes insufficient so that a molded article obtained by molding the resin composition obtained by mixing the flowability improver with the engineering plastics may cause laminar exfoliation and may impair the surface appearance and the mechanical properties.

On the contrary, when the content of the (meth)acrylate monomer unit (a2) having an ester group of phenyl group or substituted phenyl group exceeds 99.5% by mass, compatibility with engineering plastics becomes too good so that sufficient phase separation behavior producing flowability improvement effect may not be able to be developed at the time of melting.

In view of balance of these, the amount of use of the (meth)acrylate monomer unit (a2) having an ester group of phenyl group or substituted phenyl group is preferably 90% by mass or less, more preferably 80% by mass or less, further preferably 50% by mass or less and most preferably 25% by mass or less.

In addition, the above amount of use is preferably 2% by mass or more, more preferably 4% by mass or more, further preferably 7% by mass or more and most preferably 10% by mass or more.

The polymer to be used for the flowability improver of the present invention, as occasion demands, may contain 0 to 40% by mass of other monomer unit (a3) resulting from other monomers copolymerizable with the aromatic vinyl monomers and the (meth)acrylate monomers having phenyl group or substituted phenyl group in the range of not impairing the above-mentioned characteristics.

Monomers composing other monomer unit (a3) are a, P-unsaturated monomers, and examples include alkyl(meth) acrylate such as methyl(meth)acrylate, ethyl(meth)acrylate, butyl(meth)acrylate, 2-ethylhexyl acrylate, lauryl(meth) acrylate, stearyl(meth)acrylate, cyclohexyl(meth)acrylate, benzyl(meth)acrylate, t-butyl(meth)acrylate, isobornyl (meth)acrylate, and t-butylcyclohexyl(meth)acrylate; (meth) acrylates having reactive functional group such as (meth) acrylic acid, 2-hydroxyethyl(meth)acrylate, glycidyl(meth) acrylate, allyl(meth)acrylate, 1,3-butylene dimethacrylate; vinyl benzoate, vinyl acetate, maleic anhydride, N-phenyl-maleimide, and cyclohexyl maleimide. These can be used alone or in combination of two or more kinds in the range of 0 to 40% by mass in the polymer.

When the content of the above-mentioned monomer exceeds 40% by mass, flowability and chemical resistance improvement effect of the thermoplastic resin composition in which the flowability improver was mixed with engineering plastics tends to deteriorate.

The content of other monomer unit (a3) in the copolymer is preferably 30% by mass or less, more preferably 20% by mass or less, further preferably 10% by mass or less and most preferably 5% by mass or less.

The flowability improver of the present invention is excellent in compatibility with engineering plastics such as polycarbonate so that the transparency of the mixture thereof is satisfactory. If the copolymer is arranged for two-component system comprising the aromatic vinyl monomer unit (a1) and the (meth)acrylate monomer unit (a2) in which an ester group contains phenyl group or substituted phenyl group and these contents are controlled in the specified range, extremely high transparency can be developed.

As to the specified range, there are two cases of the above extent. One case is that the aromatic vinyl monomer unit (a1) is 0.5 to 40% by mass and the (meth)acrylate monomer unit (a2) having an ester group of phenyl group or substituted phenyl group is 60 to 99.5% by mass (total amount of both is 100% by mass) in the copolymer. Another case is that the aromatic vinyl monomer unit (a1) is 60 to 99.5% by mass and the (meth)acrylate monomer unit (a2) having an ester group of phenyl group or substituted phenyl group is 0.5 to 40% by mass in the copolymer.

In addition, weight average molecular weight of the copolymer to be used for the flowability improver for engineering plastics of the present invention is 5000 to 150000.

When the weight average molecular weight is less than 5000, low molecular-mass portion relatively increases so that various kinds of functions such as heat resistance and rigidity tend to deteriorate. In addition, there is a concern about much possibility causing problems such as smoking at melt molding, mist, a machine stain and defective surface appearance such as fish eye and silver streaks. In the above-mentioned range, when excellent transparency (temperature dependency of haze) at high temperature is required, the copolymer having high mass average molecular mass is preferable. Mass average molecular mass is preferably 10000 or more, more preferably 15000 or more, further preferably 30000 or more and most preferably 40000 or more.

In addition, when the mass average molecular mass exceeds 150000, melt viscosity of the resin composition blended with the flowability improver rises so that satisfactory flowability improvement effect may not be obtained.

When a remarkable flowability improvement effect is required, the mass average molecular mass is preferably 120000 or less and most preferably 100000 or less.

As a polymerization method to produce the flowability improver of the present invention, emulsion polymerization method, suspension polymerization method, solution polymerization method and bulk polymerization method can be adopted. Among these, suspension polymerization method and emulsion polymerization method are preferable in view of easiness of separation. However, in the case of emulsion polymerization method, there is a concern about the possibility that a residual salt in the thermoplastic plastic resin causes thermal decomposition of engineering plastics so that it is preferable to use emulsifying agents such as carboxylic acid salts and so on and separate the polymer by coagulation with acids, or to use nonion/anion emulsifying agents such as phosphates and separate the polymer by coagulation with salts such as calcium acetate salts.

As explained above, when the flowability improver of the present invention is used with engineering plastics, flowability (moldability) and chemical resistance can be improved without impairing the superior characteristics such as heat resistance, peel resistance and transparency, all of which engineering plastics originally have.

[Engineering Plastics]

As the engineering plastics (B) to be used for the thermoplastic composition of the present invention, various conventionally known thermoplastic engineering plastics can be available without particular restriction, and examples includes polyester polymers such as polyphenylene ether, polycarbonate, polyethylene terephthalate and polybutylene terephthalate; syndiotactic polystyrene, nylon polymer such as 6-nylon and 6,6-nylon; polyarylate, polyphenylene sulfide, polyetherketone, polyetheretherketone, polysulfone, polyethersulfone, polyamideimide, polyetherimide, polyacetal and so on.

In addition, special styrene-type resins such as the heat-resistant ABS having excellent heat resistance and melt flowability being required, and the heat-resistant acrylic resins and so on can be included as examples of engineering plastics in the present invention. Among them, polyphenylene ether, polycarbonate and so on are preferable, and an aromatic polycarbonate (C) is more preferable in view of the flowability improvement effect. These can be used alone or in combination of two or more kinds.

In addition, as the aromatic polycarbonate (C), 4,4'-dioxydiarylalkane-type polycarbonates such as 4,4'-dihydroxydiphenyl-2,2-propane (in other words, bisphenol A)-type polycarbonates can be adopted.

Molecular mass of the above-mentioned engineering plastics (B) can be determined as occasion demands, and there is no limitation in particular in the present invention. When the aromatic polycarbonate resin (C) is used as the engineering plastics (B), viscosity average molecular mass is preferably 10000 to 50000, and more preferably 15000 to 30000.

The engineering plastics (B) can be produced by various conventionally known methods. For example, when producing 4,4'-dihydroxydiphenyl-2,2-propane-type polycarbonate, a reacting method by using 4,4'-dihydroxydiphenyl-2,2-propane as the raw material and blowing phosgene in the presence of an alkaline aqueous solution and a solvent, and a reacting method of ester exchange of 4,4'-dihydroxydiphenyl-2,2-propane and a diester of carbonic acid in the presence of an catalyst can be adopted.

In addition, as the engineering plastics (B) of the present invention, engineering plastic polymer-alloys in which thermoplastic resins other than engineering plastics such as styrene-type resins such as ABS, HIPS, PS, and PAS; acrylic resins, polyolefin resins, and elastomers are mixed can be used in the range without impairing heat resistance, impact resistance, flame retardant resistance and so on which engineering plastics originally have, concretely in the range of 50 parts by mass or less per 100 parts by mass of the engineering plastics.

[Flowability Improver (A)+Engineering Plastics (B)]

Mixing ratio of the flowability improver (A) to the engineering plastics (B) can be appropriately determined depending on desired physical properties, and there is no particular limitation in the present invention, however, it is preferable to mix 0.1 to 30 parts by mass of the flowability improver (A) to 100 parts by mass of the engineering plastics to achieve the effective flowability improvement without deteriorating the performance of engineering plastics (heat resistance, impact resistance and so on). There is a concern that a sufficient improvement effect cannot be obtained when the mixing quantity of the flowability improver (A) is less than 0.1 parts by mass. In addition, there is a concern that mechanical characteristics of engineering plastics may be impaired when the mixing quantity of the flowability improver (A) exceeds 30 parts by mass. Mixing quantity of the flowability improver (A) is preferably 1 part by mass or more, more preferably 2 parts by mass or more and further preferably 3 parts by mass or more. In addition, mixing quantity of the flowability improver (A) is preferably 25 parts by mass or less, further preferably 15 parts by mass or less and most preferably 10 parts by mass or less.

Furthermore, well-known additives such as stabilizers, reinforcing agents, inorganic fillers, impact modifiers, flame retardants and fluoroolefins may be mixed with the engineering plastic resin composition of the present invention as occasion demands. For example, talc, mica, calcium carbonate, a fiber glass, a carbon fiber, a potassium titanate fiber can be mixed to improve strength, rigidity and flame resistance of the molded article. In addition, other engineering plastic compositions such as polyethylene terephthalate for improvement of chemical resistance and so on, and rubber-like elastomers comprising two layers of core/shell structure for improving the impact resistance can be mixed.

The engineering plastics (B) and the flowability improver (A) can be mixed in powder, and they also can be provided by heat-kneading.

As for such mixing methods, for example, methods using Henschel mixer, Banbury mixer, a single-screw extruder, a twin-screw extruder, a twin roll, a kneader and Brabender are included.

In addition, the masterbatch that the flowability improver (A) and the engineering plastics (B) were mixed can be prepared in advance so that the ratio of flowability improver becomes high, and afterward, the engineering plastics (B) can be mixed again with the masterbatch to provide the desired composition.

The molded article of the present invention is provided by injection molding the above-mentioned thermoplastic resin composition. In particular, the flowability/chemical resistance balance that cannot be achieved by making molecular mass of engineering plastics low can be improved so that it is extremely effective for automobile members such as headlamps, OA machineries and large/thin-walled injection moldings of electricity/electronic equipment for which chemical resistance is required. A method of injection molding is not limited in particular and it can be applied by publicly known methods.

The lamp cover of the present invention is provided by mixing (kneading) the flowability improver (A) and the polycarbonate resin (C).

In the lamp cover of the present invention, melt flowability (moldability) and chemical resistance can be improved without impairing excellent characteristics such as heat resistance, peel resistance and transparency which the aromatic polycarbonate resin (C) originally has by using such these polycarbonate-alloys.

As for mixing the flowability improver (A) and the aromatic polycarbonate resin (C), various conventionally well-known mixing and kneading methods can be applied. For example, methods using Henschel mixer, Banbury mixer, a single-screw extruder, a twin-screw extruder, a twin roll, a kneader and Brabender are included.

In the polycarbonate resin-alloys, the content of the aromatic polycarbonate resin (C) and the flowability improver (A) can be appropriately determined depending on desired physical properties, and there is no limitation in particular in the present invention. However, it is preferable that the content of the aromatic polycarbonate resin (C) is 80 to 99.5% by mass and the content of the flowability improver (A) is 0.5 to 20% by mass to get the effective improvement effect of moldability and chemical resistance without impairing characteristics (heat resistance, impact resistance and so on) of the aromatic polycarbonate resin (C). When the content of the flowability improver (A) is less than 0.5% by mass, there is a concern that sufficient improvement effects might not be provided. On the contrary, when the content of the flowability improver (A) is more than 20% by mass, there is a concern that excellent mechanical properties of the aromatic polycarbonate resin (C) might be impaired.

A lower limitation of the content of the flowability improver (A) is preferably 1% by mass or more, more preferably 2% by mass or more, and further preferably 3% by mass or more. On the contrary, an upper limitation of the content of flowability improver (A) is preferably 15% by mass or less and more preferably 10% by mass or less.

In addition, for the polycarbonate resin alloys in the present invention, stabilizers such as triphenyl phosphite, tris(nonylphenyl)phosphite, distearyl pentaerythritol diphosphite, diphenyl hydrogen diphosphite and Irganox 1076 (stearyl-β-(3,5-di-tert-butyl-4-hydroxyphenyl)propionate), weather resistant agents such as 2-(2'-hydroxy-5'-methylphenyl)benzotriazole, 2-(2'-hydroxy-3',5'-di-tert-amylphenyl)benzotriazole, 2-(2'-hydroxy-4'-octoxyphenyl)-benzotriazole and 2-hydroxy-4-octoxybenzophenone, antistatic agents, surface lubricants, dyestuffs and pigments may be added in the range of not impairing transparency of the alloy and effects of the present invention.

The lamp cover of the present invention can be provided by molding the polycarbonate resin-alloys by various molding processes such as injection molding, compression molding, extrusion molding, blow molding and casting. Among them, injection molding is the simplest and the easiest method, and it is preferable. In injection molding, the working temperature of melting and processing of the alloys is preferably 250 to 350° C.

The lamp cover of the present invention is excellent in melt flowability (moldability), and the large/thin-walled molding which has not conventionally existed can be performed easily. In addition, the resulting lamp cover is excellent in chemical resistance for solvents such as gasoline without impairing superior characteristics of aromatic polycarbonates.

EXAMPLES

The present invention is explained by examples in detail in the following. In addition, in the following description, "part" and "%" mean "part by mass" and "% by mass" unless otherwise specified.

Production Example 1

Production of the Flowability Improver (A-1)

To a separable flask equipped with a cooling pipe and a stirrer, 0.4 part of calcium phosphate and 150 parts of distilled water were charged. Subsequently, a mixture in which 80 parts of styrene, 20 parts of phenyl methacrylate, 1 part of AIBN and 0.5 parts of t-butyl mercaptan were dissolved was added, and after stirring for a while, nitrogen bubbling was performed for 30 minutes. Under nitrogen atmosphere, polymerization was accomplished after stirring at 80° C. for 4 hours followed by stirring at 90° C. for 1 hour. After dividing and washing the precipitates, the flowability improver (A-1) was obtained after drying at 75° C. for 24 hours. The mass average molecular mass (Mw) was 92000.

Production Example 2

Production of the Flowability Improver (A-2)

To a separable flask equipped with a cooling pipe and a stirrer 1.0 part (solid content) of an anionic emulsifying agent ("Latemul ASK", produced by Kao Corporation) (solid content 28%) and 290 parts of distilled water were charged, then heated to 80° C. in a water bath under nitrogen atmosphere. Subsequently, 0.0001 parts of ferrous sulfate, 0.0003 parts of disodium ethylenediamine tetraacetate salt and 0.3 parts of Rongalite were dissolved in 5 parts of distilled water, and then added. Afterward, a mixture of 80 parts of styrene, 20 parts of phenyl methacrylate, 0.2 parts of t-butylhydroxy peroxide and 0.3 parts of n-octyl mercaptan was dropped for 180 minutes. The polymerization was accomplished after further stirring for 60 minutes. Then, 300 parts of aqueous solutions in which sulfuric acid was dissolved in the proportion of 0.7% were warmed to 70° C., and it was stirred. The obtained polymer emulsion was slowly dropped in this solution, and then it was coagulated. After separating and washing the precipitates, the flowability improver (A-2) was obtained after drying at 75° C. for 24 hours. The mass average molecular mass (Mw) was 77000.

Production Example 3

Production of the Flowability Improver (A-3)

The flowability improver (A-3) was obtained by the same method as in Production Example 2 except that the amount of n-octyl mercaptan was changed from 0.3 parts to 0.5 parts. The mass average molecular mass (Mw) was 50000.

Production Example 4

Production of the Flowability Improver (A-4)

The flowability improver (A-4) was obtained by the same method as in Production Example 2 except that the amount of n-octyl mercaptan was changed from 0.3 parts to 1 part. The mass average molecular mass (Mw) was 27100.

Production Example 5

Production of the Flowability Improver (A-5)

The flowability improver (A-5) was obtained by the same method as in Production Example 2 except that 20 parts of phenyl methacrylate and 0.3 parts of n-octyl mercaptan were changed to 19 parts of phenyl methacrylate and 2 parts of n-octyl mercaptan. The mass average molecular mass (Mw) was 14300.

Production Example 6

Production of the Flowability Improver (A-6)

The flowability improver (A-6) was obtained by the same method as in Production Example 5 except that the monomer composition of 80 parts of styrene and 19 parts of phenyl methacrylate was changed to the monomer composition of 60 parts of styrene and 39 parts of phenyl methacrylate. The mass average molecular mass (Mw) was 13800.

Production Example 7

Production of the Flowability Improver (A-7)

The flowability improver (A-7) was obtained by the same method as in Production Example 5 except that the monomer composition of 80 parts of styrene and 19 parts of phenyl methacrylate was changed to the monomer composition of 25 parts of styrene and 74 parts of phenyl methacrylate. The mass average molecular mass (Mw) was 13800.

Production Example 8

Production of the Flowability Improver (B-1)

The flowability improver (B-1) was obtained by the same method as in Production Example 5 except that the monomer composition of 80 parts of styrene, 19 parts of phenyl methacrylate and 1 part of methyl acrylate was changed to the monomer composition of 96 parts of styrene and 4 parts of butyl acrylate. The mass average molecular mass (Mw) was 14000.

Production Example 9

Production of the Flowability Improver (B-2)

The flowability improver (B-2) was obtained by the same method as in Production Example 2 except that the monomer composition of 80 parts of styrene, 20 parts of phenyl methacrylate and 0.3 parts of n-octyl mercaptan was changed to the monomer composition of 74 parts of phenyl methacrylate, 25 parts of methyl methacrylate, 1 part of methyl acrylate and 0.4 part of n-octyl mercaptan. The mass average molecular mass (Mw) was 60000.

The monomer compositions, mass average molecular masses (Mw) of thus obtained copolymers and polymerization methods for the copolymers produced in Production Examples 1 to 9 described above are shown in Table 1.

TABLE 1

|  |  | Production Example 1 | Production Example 2 | Production Example 3 | Production Example 4 | Production Example 5 | Production Example 6 | Production Example 7 | Production Example 8 | Production Example 9 |
|---|---|---|---|---|---|---|---|---|---|---|
| Flowability improver |  | A-1 | A-2 | A-3 | A-4 | A-5 | A-6 | A-7 | B-1 | B-2 |
| Composition | St | 80 | 80 | 80 | 80 | 80 | 60 | 25 | 96 | — |
|  | PhMA | 20 | 20 | 20 | 20 | 19 | 39 | 74 | — | 74 |
|  | MA | — | — | — | — | 1 | 1 | 1 | — | 1 |
|  | BA | — | — | — | — | — | — | — | 4 | — |
|  | MMA | — | — | — | — | — | — | — | — | 25 |
|  | t-dodecyl mercaptan | 0.5 | — | — | — | — | — | — | — | — |
|  | n-octyl mercaptan | — | 0.3 | 0.5 | 1 | 2 | 2 | 2 | 2 | 0.4 |
|  | AIBN | 1 | — | — | — | — | — | — | — | — |
|  | t-butyl hydroperoxide | — | 0.2 | 0.2 | 0.2 | 0.2 | 0.2 | 0.2 | 0.2 | 0.2 |
| Polymerization method |  | Suspension | Emulsion | Emulsion | Emulsion | Emulsion | Emulsion | Emulsion | Emulsion | Emulsion |
| Mass average molecular mass |  | 92000 | 77000 | 50000 | 27100 | 14300 | 13800 | 13800 | 14000 | 60000 |

Abbreviations in Table 1 mean as follows:
St: styrene
PhMA: phenyl methacrylate
MA: methyl acrylate
BA: butyl acrylate
MMA: methyl methacrylate Examples 1 to 7

Comparative Examples 1 to 3

The obtained flowability improvers and polycarbonate resins were mixed in the manner of mass ratio shown in Table 2, and then supplied into a twin-screw extruder (model name "TEM-35", produced by Toshiba Machine Co., Ltd.) and after that, it was melt kneaded at 280° C. and engineering plastic compositions were obtained.

Evaluation methods (1) to (5) described below were performed on the obtained thermoplastic compositions. The results are shown in Table 2.

TABLE 2

|  |  |  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|---|
| Composition | Flowability improver | A-1 | 5 | — | — | — | — | — | — | — | — | — |
|  |  | A-2 | — | 5 | — | — | — | — | — | — | — | — |
|  |  | A-3 | — | — | 5 | — | — | — | — | — | — | — |
|  |  | A-4 | — | — | — | 5 | — | — | — | — | — | — |
|  |  | A-5 | — | — | — | — | 5 | — | — | — | — | — |
|  |  | A-6 | — | — | — | — | — | 5 | — | — | — | — |
|  |  | A-7 | — | — | — | — | — | — | 5 | — | — | — |
|  |  | B-1 | — | — | — | — | — | — | — | 5 | — | — |
|  |  | B-2 | — | — | — | — | — | — | — | — | 5 | — |
|  | PC1 |  | 95 | 95 | 95 | 95 | 95 | 95 | 95 | 95 | 95 | 100 |
| Evaluation results | Melt flowability (SPL:mm) |  | 310 | 315 | 320 | 335 | 340 | 315 | 290 | 360 | 260 | 265 |
|  | Chemical resistance (sec) |  | ≥600 | ≥600 | ≥600 | ≥600 | ≥600 | ≥600 | 100 | ≥600 | 25 | 25 |
|  | Surface-layer peeling |  | ○ | ○ | ○ | ○ | ○ | ○ | ○ | X | ○ | ○ |

TABLE 2-continued

|  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Deflection temperature under load (° C.) | 130 | 130 | 129 | 128 | 128 | 128 | 127 | 130 | 126 | 131 |
| Total light transmittance (%, 23° C.) | 90 | 90 | 90 | 90 | 90 | 90 | 90 | 88 | 90 | 91 |
| Haze (%, 23° C.) | 0.6 | 0.6 | 0.8 | 0.9 | 1.4 | 5 | 0.7 | 3.5 | 0.6 | 0.4 |
| Haze (%, 100° C.) | 0.8 | 0.6 | 0.8 | 1.7 | 4.8 | 8 | 0.8 | 12 | 0.6 | 0.4 |

PC1: polycarbonate resin ("Iupilon H-3000F", produced by Mitsubishi Engineering-Plastics Corp., viscosity average molecular mass 20000)

(Evaluation Methods of Performance)

(1) Melt Flowability

Spiral flow length (SFL) of the obtained engineering plastic composition was evaluated by using an injection molder ("IS-100", produced by Toshiba Machine Co., Ltd.). In the above evaluation, the molding temperature was set to 280° C., temperature of the mold was set to 80° C. and the injection pressure was set to 98 MPa. In addition, a molded article was set to 2 mm of the wall thickness and 15 mm of the width.

(2) Chemical Resistance

A flat sheet with a thickness of 2 mm and sizes of 15 cm×15 cm was made by an injection molder ("IS-100", produced by Toshiba Machine Co., Ltd.) by using the obtained engineering plastic composition. This sheet was cut, and test pieces with a thickness of 2 mm and sizes of 15 cm×2.5 cm were made. Cantilever testing was carried after annealing a test piece for 2 hours at 120° C., and breaking time of a test piece by coating chemicals was measured. The testing was performed in the measurement condition of testing temperature of 23° C., loading of 10 MPa and by using solvents of toluene/isooctane being 1/1% by volume.

Surface-Layer Peeling (Peeling Resistance)

A bite with a cutter was put in an ejection pin trace of a molded article, and peeling condition was observed visually. Criterion for evaluation of the results is as follows:

○: Excellent with no peeling
x: Surface-layer peeling being observed (4) Deflection Temperature Under Load (Heat Resistance)

A molded article with a thickness of ¼ inch was made by an injection molder ("IS-100", produced by Toshiba Machine Co., Ltd.) by using the obtained engineering plastic composition.

A deflection temperature under load of the molded article was measured in accordance with ASTM D648. In the above measurement, annealing was not performed and the load of 1.82 MPa was set.

(5) Transparency

A flat sheet with a thickness of 3 mm and sizes of 5 cm×5 cm was made by an injection molder ("IS-100", produced by Toshiba Machine Co., Ltd.) by using the obtained engineering plastic composition.

Total light transmittance and haze of a molded article were measured at 23° C. and 100° C. in accordance with ASTM D1003.

As it is apparent from the results of Table 2, the engineering composition obtained by Examples 1 to 7 showed much improvement in flowability and chemical resistance without impairing heat resistance, peel resistance and transparency, and it was excellent in the balance of physical properties.

On the other hand, the engineering plastic resin composition obtained by Comparative Example 1 had insufficient compatibility so that good peel resistance was not obtained.

In addition, the engineering plastic resin composition obtained by Comparative Example 2 had the flowability improver without containing the aromatic vinyl compound and with very good compatibility so that sufficient flowability and chemical resistance were not obtained.

In addition, the engineering plastic composition obtained by Comparative Example 3 did not contain the flowability improver so that sufficient flowability and chemical resistance were not obtained.

Production Example 10

Production of the Flowability Improver (A-8)

To a separable flask equipped with a cooling pipe and a stirrer 1.0 part (solid content) of an anionic emulsifying agent ("Latemul ASK", produced by Kao Corporation) (solid content 28%) and 290 parts of distilled water were charged, then heated to 80° C. in a water bath under nitrogen atmosphere. Subsequently, 0.0001 part of ferrous sulfate, 0.0003 part of disodium ethylenediamine tetraacetate salt and 0.3 part of Rongalite were dissolved in 5 parts of distilled water, then added. Afterward, a mixture of 87.5 parts of styrene, 12.5 parts of phenyl methacrylate, 0.2 part of t-butylhydroxy peroxide and 0.5 part of n-octyl mercaptan was dropped for 180 minutes. The polymerization was accomplished after further stirring for 60 minutes. Then, 300 parts of aqueous solutions in which sulfuric acid was dissolved in the proportion of 0.7% were warmed to 70° C., and it was stirred.

The obtained polymer emulsion was slowly dropped in this solution, and then it was coagulated.

After separating and washing the precipitates, the flowability improver (A-8) was obtained after drying at 75° C. for 24 hours.

The mass average molecular mass (Mw) was 49000.

Example 11

Production of the Flowability Improver (A-9)

The flowability improver (A-9) was obtained by the same method as in Production Example 10 except that the amount of n-octyl mercaptan was changed from 0.5 parts to 0.2 parts. The mass average molecular mass (Mw) was 98000.

The monomer compositions, mass average molecular masses (Mw) of thus obtained copolymers and polymerization methods for the copolymers produced in Production Examples 10 and 11 described above are shown in Table 3.

TABLE 3

|  | | Production Example 10 | Production Example 11 |
|---|---|---|---|
| Flowability improver | | A-8 | A-9 |
| Composition | St | 87.5 | 87.5 |
|  | PhMA | 12.5 | 12.5 |
|  | n-octyl mercaptan | 0.5 | 0.2 |
|  | t-butyl hydroperoxide | 0.2 | 0.2 |
| Polymerization method | | Emulsion | Emulsion |
| Mass average molecular mass | | 49000 | 98000 |

Abbreviations in Table 3 mean as follows:
St: styrene
PhMA: phenyl methacrylate

Example 8 and 9

Comparative Examples 4 and 5

The obtained flowability improvers and polycarbonate resins were mixed in the manner of mass ratio shown in Table 4, and then supplied into a twin-screw extruder (model name "TEM-35", produced by Toshiba Machine Co., Ltd.) and after that, it was melt-kneaded at 280° C. and engineering plastic compositions were obtained.

Evaluation methods (1) to (5) described below were performed on the obtained thermoplastic compositions. The results are shown in Table 4.

TABLE 4

|  |  |  | Example 8 | Example 9 | Comparative Example 4 | Comparative Example 5 |
|---|---|---|---|---|---|---|
| Composition | Flowability improver | A-8 | 7.5 | — | — | — |
|  |  | A-9 | — | 7.5 | — | — |
|  | PC2 | | — | — | 100 | — |
|  | PC3 | | 92.5 | 92.5 | — | 100 |
| Evaluation results | Melt flowability (SPL:mm) | | 335 | 247 | 177 | 222 |
|  | Chemical resistance (MPa) | | 11.5 | 11.5 | 8.5 | 8 |
|  | Surface-layer peeling | | ○ | ○ | ○ | ○ |
|  | Deflection temperature under load (° C.) | | 134 | 133 | 135 | 134 |
|  | Total light transmittance (%, 23° C.) | | 91 | 91 | 91 | 91 |
|  | Haze (%, 23° C.) | | 0.9 | 0.4 | 0.2 | 0.3 |
|  | Haze (%, 100° C.) | | 0.9 | 0.4 | 0.2 | 0.3 |

PC2: polycarbonate resin ("Panlite L1225WS", produced by Teijin Chemicals Ltd., viscosity average molecular mass 21000)
PC3: polycarbonate resin ("Panlite L1225ZL", produced by Teijin Chemicals Ltd., viscosity average molecular mass 19000)

(Evaluation Methods of Performance)
(1) Melt Flowability

Spiral flow length (SFL) of the obtained engineering plastic composition was evaluated by using an injection molder ("IS-100", produced by Toshiba Machine Co., Ltd.). In the above evaluation, the molding temperature was set to 280° C., temperature of the mold was set to 80° C. and the injection pressure was set to 98 MPa. In addition, a molded article was set to 2 mm of the wall thickness and 15 mm of the width.

(2) Chemical Resistance

A flat sheet with a thickness of 2 mm and sizes of 15 cm×15 cm was made by an injection molder ("IS-100", produced by Toshiba Machine Co., Ltd.) by using the obtained engineering plastic composition. This sheet was cut, and test pieces with a thickness of 2 mm and sizes of 12 cm×3.5 cm were made.

The method of ¼ elliptical testing was carried out after annealing a test piece for 2 hours at 120° C., and the critical stress value (MPa) of a test piece after coating chemicals for 4 hours was measured. The testing was performed in the measurement condition of testing temperature of 23° C. and by using solvents of toluene/isooctane being 1/1% by volume.

(3) Surface-Layer Peeling (Peel Resistance)

A bite with a cutter was put in an ejection pin trace of a molded article, and peeling condition was observed visually. Criterion for evaluation of the results is as follows:
○: Excellent with no peeling
x: Surface-layer peeling being observed (4) Deflection Temperature Under Load (Heat Resistance)

A molded article with a thickness of ¼ inch was made by an injection molder ("IS-100", produced by Toshiba Machine Co., Ltd.) by using the obtained engineering plastic composition.

A deflection temperature under load after the molded article had been annealed for 2 hours was measured in accordance with ASTM D648. In the above measurement, the load of 1.82 MPa was set.

(5) Transparency

A flat sheet with a thickness of 2 mm and sizes of 5 cm×10 cm was made by an injection molder ("IS-100", produced by Toshiba Machine Co., Ltd.) by using the obtained engineering plastic composition.

Total light transmittance and haze of a molded article were measured at 23° C. and 100° C. in accordance with ASTM D1003.

As it is apparent from the results of Table 4, the engineering composition obtained by Examples 8 and 9 showed much improvement in flowability and chemical resistance without impairing heat resistance, peel resistance and transparency, and it was excellent in the balance of physical properties.

On the other hand, the engineering plastic resin composition obtained by Comparative Example 4 and 5 did not contain the flowability improver so that sufficient balance of flowability and chemical resistance were not obtained.

Example 10

A flat sheet with a thickness of 2 mm and sizes of 10 cm×10 cm was made by an injection molder ("IS-100", produced by Toshiba Machine Co., Ltd.) by using the engineering plastic composition obtained by Example 9. An instrumentation-face impact test (hydroshot) was performed after treatment of hard coating by UV curing on this flat sheet. All absorbed energy was 30 J, and the fracturing morphology was a ductile fracture.

Comparative Example 6

A flat sheet with a thickness of 2 mm and sizes of 10 cm×10 cm was made by the same method as in Example 10 except that the engineering plastic composition obtained by Example 9 was used. An instrumentation-face impact test (hydroshot) was performed after treatment of hard coating by UV curing on this flat sheet. All absorbed energy was 5 J, and the fracturing morphology was a ductile fracture.

Example 12

Production of the Flowability Improver (A-10)

The flowability improver (A-10) was obtained by the same method as in Production Example 10 except that the monomer composition was changed to 90 parts of styrene and 10 parts of phenyl methacrylate. The mass average molecular mass (Mw) was 51000.

Production Example 13

Production of the Flowability Improver (B-3)

The flowability improver (B-3) was obtained by the same method as in Production Example 10 except that the monomer composition was changed to 100 parts of styrene. The mass average molecular mass (Mw) was 55000.

The monomer compositions, mass average molecular masses (Mw) of thus obtained copolymers and polymerization methods, for the copolymers produced in Production Examples 12 and 13 described above are shown in Table 5.

TABLE 5

|  | Production Example 10 | Production Example 12 | Production Example 13 |
|---|---|---|---|
| Flowability improver | A-8 | A-10 | B-3 |
| Composition St | 87.5 | 90 | 100 |
| PhMA | 12.5 | 10 | — |
| n-octyl mercaptan | 0.5 | 0.5 | 0.5 |
| t-butyl hydroperoxide | 0.2 | 0.2 | 0.2 |
| Polymerization method | Emulsion | Emulsion | Emulsion |
| Mass average molecular mass | 49000 | 98000 | 55000 |

Abbreviations in Table 5 mean as follows:
St: styrene
PhMA: phenyl methacrylate

Examples 11 to 15 and Comparative Examples 7 to 9

(Production of Polycarbonate Resin-Alloys and Evaluation of Molded Articles)

The polymer (A-8), (A-10), (A-3) or (B-3) was mixed with each ingredient shown in Table 6 in a ratio (mass ratio) shown in Table 6, respectively, and the mixtures were supplied into a twin-screw extruder (model name "TEM-35", produced by Toshiba Machine Co. Ltd.) and after that, they were melt-kneaded at 280° C. and polycarbonate resin-alloys were obtained.

Abbreviations and materials used in Table 6 are described in the following.

PC4: polycarbonate resin ("Panlite L-1225Z-100", produced by Teijin Chemicals Ltd., viscosity average molecular mass 22000)

PC5: polycarbonate resin ("Panlite L-1225ZL-100", produced by Teijin Chemicals Ltd., viscosity average molecular mass 19000)

TABLE 6

|  |  |  | Example 11 | Example 12 | Example 13 | Example 14 | Example 15 | Comparative Example 7 | Comparative Example 8 | Comparative Example 9 |
|---|---|---|---|---|---|---|---|---|---|---|
| Composition | Flowability improver | A-8 | 5 | 7.5 | 10 | — | — | — | — | — |
|  |  | A-10 | — | — | — | 5 | — | — | — | — |
|  |  | A-3 | — | — | — | — | 5 | — | — | — |
|  |  | B-3 | — | — | — | — | — | 5 | — | — |
|  | PC4 |  | — | — | — | — | — | — | 100 | — |
|  | PC5 |  | 95 | 92.5 | 90 | 95 | 95 | 95 | — | 100 |
| Evaluation results | Melt flowability (SPL:mm) |  | 211 | 290 | 400 | 215 | 212 | 215 | 144 | 210 |
|  | Chemical resistance (MPa) |  | 9.3 | 11.5 | 13 | 9 | 8.7 | 9.3 | 8.5 | 6 |
|  | Surface-layer peeling |  | ○ | ○ | ○ | ○ | ○ | X | ○ | ○ |
|  | Deflection temperature under load (° C.) |  | 130 | 129 | 128 | 129 | 129 | 129 | 131 | 128 |
|  | Total light transmittance (%, 23° C.) |  | 90 | 90 | 90 | 90 | 90 | 88 | 91 | 91 |
|  | Haze (%) |  | 0.4 | 0.7 | 1.1 | 0.5 | 0.7 | 3.5 | 0.2 | 0.2 |
|  | Surface appearance of lens |  | ○ | ○ | ○ | ○ | ○ | X | ○ | ○ |

Evaluation methods (1) to (6) described below were performed on the obtained polycarbonate resin-alloys. The results are shown in Table 6.

(Evaluation Methods of Performance)

(1) Melt Flowability

Spiral flow length (SFL) of the obtained polycarbonate resin-alloy was evaluated by using an injection molder ("IS-100", produced by Toshiba Machine Co., Ltd.). In the above evaluation, the molding temperature was set to 280° C., temperature of the mold was set to 80° C. and the injection pressure was set to 98 MPa. In addition, a molded article was set to 2 mm of the wall thickness and 15 mm of the width.

In addition, for size-increasing/thin-walling of a lamp cover, it is preferable that the above SFL value is within the range of 200 mm or more.

(2) Chemical Resistance

A flat sheet with a thickness of 2 mm and sizes of 15 cm×15 cm was made by an injection molder ("IS-100", produced by Toshiba Machine Co., Ltd.) by using the obtained polycarbonate resin-alloy. This sheet was cut, and test pieces with a thickness of 2 mm and sizes of 3.5 cm×15 cm were made.

The method of ¼ elliptical solvent testing (constant strain testing) was carried out after annealing a test piece for 2 hours at 120° C., measurement of cracking places of a test piece after 60 minutes of coating solvents was performed, and then, the critical stress value (MPa) was calculated. The testing was performed in the measurement condition of testing temperature of 23° C. and by using solvents of toluene/isooctane being 1/1% by volume.

In addition, it is preferable that the value of the above chemical resistance is within the range of 8.5 MPa or more to use as lamp covers for automobiles and so on.

(3) Surface-Layer Peeling (Peel Resistance)

A bite with a cutter was put in an ejection pin trace of a molded article, and peeling condition was observed visually. Criterion for evaluation of the results is as follows:

○: Excellent with no peeling x: Surface-layer peeling being observed (4) Heat Resistance (Deflection Temperature Under Load)

A molded article with a thickness of ¼ inch was made by an injection molder ("IS-100", produced by Toshiba Machine Co., Ltd.) by using the obtained polycarbonate resin-alloys.

A deflection temperature under load of the molded article was measured in accordance with ASTM D648.

In the above measurement, annealing was not performed and the load of 1.82 MPa was set.

In addition, it is preferable that the value of the above heat resistance is within the range of 120° C. or more to use as lamp covers for automobiles and so on.

(5) Transparency (Total Light Transmittance and Haze)

A molded article of flat sheet with a thickness of 2 mm and sizes of 5 cm×5 cm was molded by an injection molder ("IS-100", produced by Toshiba Machine Co., Ltd.) by using the obtained polycarbonate resin-alloys.

Total light transmittance and haze of the molded article were measured at 23° C. in accordance with ASTM D1003.

In addition, for a lamp cover, it is preferable that total light transmittance is within the range of 88% or more. Furthermore, it is preferable that haze is within the range of 2% or less.

(6) Lens Appearance

A molded article of flat sheet with a thickness of 2 mm and sizes of 5 cm×5 cm was molded by an injection molder ("IS-100", produced by Toshiba Machine Co., Ltd.) by using the obtained polycarbonate resin-alloys. A light from HID lamp ("HID Handy Light Pro NN13000", produced by Matsushita Electric Works, Ltd.) was exposed to the molded article, and a lens appearance (an appearance under strong light sources) was observed visually. Criterion for evaluation of the results is as follows:

○: Excellent in colorless and transparency x: Surface-layer peeling being observed As it is apparent from the results of Table 6, the molded articles of polycarbonate resin-alloys obtained in Examples 11 to 15 showed not only sufficient heat resistance and transparency, but also much improvement in flowability and chemical resistance so that they were excellent in the characteristics necessary for large/thin-walled lamp covers.

On the other hand, the molded article of polycarbonate resin-alloys obtained by Comparative Example 7 shows less peeling resistance and transparency, and was not good in lens appearance compared with the molded articles of polycarbonate resin-alloys obtained in Examples 11 to 15. This is thought because the compatibility between the polymer B-1 and the polymer PC-4 might be insufficient.

In addition, the molded article of polycarbonate resin alloys obtained in Comparative Examples 8 and 9 which do not contain the copolymer (A-8), (A-10) or (A-3) could not perform the balance of sufficient melt flowability and chemical resistance necessary for the large/thin-walled lamp covers compared with the molded articles of polycarbonate resin alloys obtained in Examples 11 to 15.

INDUSTRIAL APPLICABILITY

The flowability improver of the present invention can provide a remarkable improvement effect of melt flowability (moldability) without impairing characteristics of engineering plastics (transparency, heat resistance, peel resistance and chemical resistance), by adding a small amount of it in engineering plastics. The engineering plastics containing the flowability improver is excellent in various physical properties and melt flowability (moldability) so that optional molded articles with more complicated shapes, large models or thin-walled models can be provided easily and stably. Furthermore, it is extremely industrially useful for OA (office automation) machineries, information/communications equipment, electricity/electronic equipment, electric appliances, automobile members and building members. In addition, the lamp cover of the present invention is provided from the polycarbonate resin-alloys excellent in melt flowability (moldability), and in solvent resistance without impairing superior characteristics of aromatic polycarbonates. Therefore, optional molded articles of lens covers with more complicated shapes, large models or thin-walled models can be provided easily and stably. Therefore, it is extremely industrially useful for OA (office automation) machineries, information/communications equipment, electricity/electronic equipment, electric appliances, automobile members and building members, and is especially for lens covers of thin-walled/oversized headlamps of automobiles and so on.

The invention claimed is:

1. A thermoplastic resin composition provided by mixing 0.1 to 30 parts by mass of a flowability improver for engineering plastics with 100 parts by mass of an engineering plastic (B), wherein the flowability improver for engineering plastics comprises a polymer (A) comprising 50 to 93% by mass of aromatic vinyl monomer unit (a1), 7 to 50% by mass of phenyl(meth)acrylate monomer unit (a2), and 0 to 40% by mass of other monomer unit (a3) (a total of the units (a1) to (a3) is 100% by mass), wherein polymer (A) has a weight average molecular weight of 30000 to 100000 wherein the engineering plastics (B) is a polycarbonate resin, and, wherein the polymer (A) is obtained by suspension polymerization or emulsion polymerization.

2. A molded article provided by injection molding the thermoplastic resin composition according to claim 1.

3. A member for automobiles provided by injection molding the thermoplastic resin composition according to claim 1.

4. A lamp cover provided by injection molding the thermoplastic resin composition according to claim 1.

5. The thermoplastic resin composition according to claim 1, wherein a polymer (A) comprises 75 to 90% by mass of aromatic vinyl monomer unit (a1), 10 to 25% by mass of phenyl (meth)acrylate monomer unit (a2).

6. A thermoplastic resin composition provided by mixing 0.1 to 30 parts by mass of a flowability improver for engineering plastics with 100 parts by mass of an engineering plastic (B), wherein the flowability improver for engineering plastics comprises a polymer (A) consisting essentially of 50 to 93% by mass of aromatic vinyl monomer unit (a1), and 7 to 50% by mass of phenyl(meth)acrylate monomer unit (a2) (a total of the units (a1) to (a2) is 100% by mass), wherein polymer (A) has a weight average molecular weight of 30000 to 100000, wherein the engineering plastics (B) is a polycarbonate resin, and wherein the polymer (A) is obtained by suspension polymerization or emulsion polymerization.

7. The thermoplastic resin composition according to claim 6 which comprises a polymer (A) consisting essentially of 75 to 90% by mass of aromatic vinyl monomer unit (a1), and 10 to 25% by mass of phenyl(meth)acrylate monomer unit (a2).

8. The thermoplastic resin composition according to claim 1, wherein the flowability improver for engineering plastics comprises a polymer (A) comprising 50 to 90% by mass of aromatic vinyl monomer unit (a1), 10 to 50% by mass of phenyl(meth)acrylate monomer unit (a2), and 0 to 40% by mass of other monomer unit (a3) (a total of the units (a1) to (a3) is 100% by mass), wherein polymer (A) has a weight average molecular weight of 30000 to 100000, and the engineering plastic (B) is a polycarbonate resin;
wherein the polymer (A) is obtained by suspension polymerization or emulsion polymerization.

9. The thermoplastic resin composition according to claim 6, wherein
the flowability improver for engineering plastics comprises a polymer (A) consisting essentially of 50 to 90% by mass of aromatic vinyl monomer unit (a1), and 10 to 50% by mass of phenyl(meth)acrylate monomer unit (a2), wherein polymer (A) has a weight average molecular weight of 30000 to 100000, and
the engineering plastic (B) is a polycarbonate resin;
wherein the polymer (A) is obtained by suspension polymerization or emulsion polymerization.

* * * * *